UNITED STATES PATENT OFFICE 3,657,428
Patented Apr. 18, 1972

3,657,428
SULFAGUANIDINE USED AGAINST MAREK'S DISEASE
Tsung-Ying Shen, Westfield, and Theodore A. Maag, New Shrewsbury, N.J., assignors to Merck & Co., Inc., Rahway, N.J.
No Drawing. Filed June 30, 1970, Ser. No. 51,340
Claims priority, application Great Britain, July 17, 1969, 36,089/69
Int. Cl. A61k *27/00*
U.S. Cl. 424—228                                      6 Claims

ABSTRACT OF THE DISCLOSURE

The use of sulfaguanidine and soluble salts thereof in reducing mortality and decreasing lesion incidence of poultry exposed to Marek's disease and to compositions comprising the sulfaguanidine as the active ingredient are provided.

SUMMARY OF THE INVENTION

This invention relates to the use of sulfaguanidine in reducing mortality and decreasing lesion incidence of poultry exposed to Marek's disease and to a composition containing sulfaguanidine as the essential active ingredient. More particularly, the instant invention relates to the use of sulfaguanidine and pharmaceutically acceptable acid addition salts thereof in the treatment and control of Marek's disease.

In another aspect of the invention, it relates to the use of substituted sulfaguanidines, especially $N_4$- and/or $N_2$-substituted sulfaguanidines. The invention also relates to the use of certain sulfanilamides and $N_4$- and/or $N_1$-substituted sulfanilamides. These compounds can be employed also in the pharmaceutically acceptable salt form in the treatment and control of Marek's disease.

Marek's disease is a highly infectious lymphoproliferative disorder of poultry, especially chickens. Marek's disease has also been known as neural leukosis, neuralympomatosis, acute avian leukosis, and skin leukosis. The causative agent(s) are viral with a cell associated Herpes-type virus definitely implicated as an etiological factor. Marek's disease usually is clinically evident in birds prior to sexual maturity, i.e., before the first egg is laid. Clinical manifestations may be one or more of these signs: regional or generalized paralysis, diarrhea with fecal staining of posterior abdominal feathers, weight loss, dyspnea, blindness, enlarged abdomen, or death.

The lesions evident are non-necrotic and include one or more of the following: lymphocytic infiltrated peripheral nerves and/or feather follicles; lymphoproliferative foci, microscopic to several mm. in size, within any tissue of the body but principally within the liver, spleen, kidney, gonads, heart, proventriculus, breast muscle, skin, and nerves.

Marek's disease is estimated by the U.S. Department of Agriculture to cause a $200 million annual loss to the U.S. poultry industry. This loss is due to mortality and to the rejection of slaughtered bird carcasses as being unfit for human consumption. This rejection is due to the presence of the lymphoproliferative foci.

DESCRIPTION OF THE PRIOR ART

Sulfaguanidine and substituted derivatives thereof, and substituted and unsubstituted sulfanilamides have been described in the literature. Syntheses and descriptions of many compounds in these series are found in E. H. Northey, Sulfonamides, A.C.S. monograph No. 106 (New York, 1948).

In addition, there is discussion in the literature of the use of certain specific sulfa compounds in the treatment of a virus disease of chickens. See F. D. Asplin, Nature, 3878 (Feb. 26, 1966), p. 253. Asplin found that sulphadiazine prevented the development of gross lesions of fowl paralysis when administered orally to chicks at a level of 0.7% to 2.2% in the diet (weight percent basis). Asplin found that sulfanilamide was toxic at these levels, and sulfaguanidine was the least active of the six compounds tested.

The use levels disclosed by Asplin are too high to be commercially feasible, and in addition, serious residue problems occur when relatively large amounts of sulfaguanidine are administered orally to poultry. The treated poultry can then be unsuitable for human consumption.

OBJECTS OF THE INVENTION

It is an abject of this invention to provide a composition, which when administered orally to poultry, reduces mortality and decreases lesion incidence of poultry exposed to Marek's disease. It is a further object of this invention to provide a composition containing a specific level of sulfaguanidine which accomplishes the positive relief without adverse effects of residue or toxicity. It is still a further object of this invention to provide a composition containing sulfaguanidine which promotes the growth of poultry when orally administered. It is yet another object of this invention to provide a new verterinary use for sulfaguanidine as a growth promotant of poultry.

As the active ingredient in the formulations of this invention, there is employed sulfaguanidine having the formula

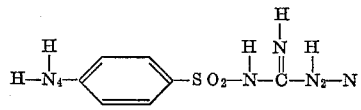

and $N_4$- and/or $N_2$-substituted derivatives of sulfaguanidine and pharmaceutically acceptable acid addition salts thereof. It is contemplated that dosage units containing such sulfaguanidines will be administered, either orally or by injection, to poultry in the treatment and control of Marek's disease. Preferably, the compound is administered orally.

In the most preferable embodiment of this invention, sulfaguanidine itself is the active agent against Marek's disease. The substituted sulfaguanidines which also show some activity in the control of the disease form a part of this invention, but are less preferred embodiments.

Illustrative of the substituent groups which may be present on the $N_2$ nitrogen atom in the active sulfaguanidines of this invention, for example, one or two groups such as loweralkyl including straight or branched chain, saturated or unsaturated, loweralkyl groups containing from 1 to 6 carbon atoms such as methyl, ethyl, isopropyl, propenyl, propynyl, allyl and n-hexyl; loweralkanoyl groups containing 1–6 carbon atoms such as formyl, acetyl, or hexanoyl; aryl such as phenyl, substituted phenyl including, for example, loweralkyl phenyl wherein the loweralkyl moiety may be straight or branched chain, saturated or unsaturated and contains from 1–6 carbon atoms such as methylphenyl, propenylphenyl, allylphenyl and n-hexylphenyl, loweralkoxyphenyl wherein the loweralkoxy moiety may be straight or branched chain, saturated or unsaturated and contains from 1–6 carbon atoms such as ethoxyphenyl, isopropoxyphenyl, allyloxyphenyl, and butoxyphenyl, halophenyl, carboxyphenyl, aminophenyl, and naphthyl, cyano, amino, nitro, carbamoyl, thiocarbamoyl, and guanyl and loweralkyl, loweralkoxy and aryl derivatives thereof.

The preferred $N_2$-substituents are loweralkanoyl and guanyl.

Substituent groups which may be present on the $N_4$ nitrogen atom will include, for example, one or more groups such as loweralkanoyl and aminoloweralkanoyl groups which may be straight or branched chain, saturated or unsaturated, containing from 1–6 carbon atoms such as formyl, acetyl, propionyl, isobutyryl, crotonyl, acryl, alanyl and valyl; alkoxy carbonyl groups which may be straight or branched chain, saturated or unsaturated, containing from 1–6 carbon atoms in the alkoxy moiety such as methoxycarbonyl, ethoxycarbonyl, isopropoxycarbonyl and n-butoxycarbonyl; carboxyloweralkanoyl groups and loweralkylester derivatives thereof wherein the loweralkanoyl and loweralkyl moieties may be straight or branched chain, saturated or unsaturated, containing from 1–6 carbon atoms such as carboxyacetyl, carboxypropionyl, carboxybutyryl, carboethoxypropionyl and carbomethoxyacetyl; aroyl groups such as benzoyl and salicyl; carboxyaroyl groups and loweralkyl ester derivatives thereof wherein the loweralkyl moiety may be straight or branched chain, saturated or unsaturated, containing from 1–6 carbon atoms such as carboxybenzoyl, methylphthaloyl and n-hexylphthaloyl; the carbamoyl group and mono- and diloweralkyl derivatives thereof wherein the loweralkyl moiety may be straight or branched chain, saturated or unsaturated, containing from 1–6 carbon atoms such as N-methylcarbamoyl, N,N-diethylcarbamoyl and N-butylcarbamoyl; and loweralkylidenyl and arylidenyl groups derived from aldehydes such as acetaldehyde, propionaldehyde, n-valeraldehyde, benzaldehyde, p-chlorobenzaldehyde, o-hydroxybenzaldehyde, m-methoxy-p-hydroxybenzaldehyde and furfuraldehyde. Also included within the scope of this invention are the $N_4$-bis-sulfaguanidines derived from dicarboxylic acids and dialdehydes.

The most preferred $N_4$-substituents are those which are loweralkanoyl, and especially preferred are acetyl and formyl.

Combinations of $N_2$- and $N_4$-substituents can also be employed; for instance, a preferred compound is one in which both $N_2$ and $N_4$ are loweralkanoyl. One specific compound has both $N_2$ and $N_4$ substituted with acetyl.

Sulfaguanidine and substituted sulfaguanidines of the type disclosed above are known compounds and are either available commercially or may be prepared by methods already fully described in the art. Their effectiveness in the treatment and control of Marek's disease is tested in vivo by employing chickens which have been infected with virus containing lymphoblasts originally obtained from a chicken with a typical case of Marek's disease. The test procedure is as follows: Athens-Canadian (A-C) random bred chicks, in groups of five each, were placed in cages with wire floors. They were fed ad libitum a standard poultry ration in which concentrations of sulfaguanidine were blended just prior to use. Normal and infected control birds were fed basal ration containing no test compound. After 24 hours on medication, the chicks were injected with a challenge inoculum of Marek's disease virus. The inoculate was originally obtained from a typical field case of Marek's disease in commercial broilers. The inoculate characteristically produces lymphoid tumors of the liver, spleen, kidney, and gonads.

The oral medication in the feed is continued throughout the experiment as a stated percentage of the diet. After an appropriate experimental period, wherein over 50% of the non-medicated infected controls succumb, all surviving birds are sacrificed. All dead and sacrificed birds are autopsied and lesion incidence recorded.

In accordance with this invention, sulfaguanidine is employed for controlling Marek's disease by administering them to poultry susceptible or exposed to the disease, either in the drinking water, feed, or parenterally. The preferable mode of administration is orally, either in the drinking water or feed.

It is most preferred to disperse the sulfaguanidine in the finished feed of the animals, and to administer the medicated feed ad libitum to the birds. Good results against Marek's disease are achieved with feedstuff containing from about 0.002% to 0.1% by weight of the sulfaguanidine. Drug levels can also operably be from 0.0002% to 0.2% in the feed. The preferred range is between 0.01% to 0.1% in the feed. Levels in poultry feed are here expressed in terms of percent by weight concentration.

The higher levels may be used in treating an established outbreak of Marek's disease, but the higher dosages are not preferred for prophylactic treatment where medicated feed is given continuously to the poultry. It will be appreciated by those skilled in this art that these low levels will eminilate any toxicity or residue problems which result from feeding of high levels of sulfaguanidine.

The finished feed in which the above-described levels of sulfaguanidine are employed is a nutritionally adequate one containing sources of carbohydrate, protein, fat, vitamins, minerals and other nutritional factors commonly employed in commercial poultry raising. In addition, other poultry feed additives such as coccidiostats, e.g., amprolium, ethopabate, nicarbazin, can be employed in the compositions.

In addition to administration via the solid feedstuff, sulfaguanidine can be administered to poultry by incorporation in the drinking water. The preferred dose levels in the drinking water are usually somewhat less than those employed in a solid feed inasmuch as poultry drink about twice as much as they eat. The operable level in drinking water is from 0.0001% to 0.1% by weight of sulfaguanidine and the preferred range is 0.005% to 0.1% by weight. Administration via the drinking water is of advantage when using the compound therapeutically rather than prophylatically. For this purpose it is convenient to prepare dispersible or water-soluble powders in which the sulfaguanidine is intimately dispersed in a suitable water-soluble or dispersable liquid or solid carrier such as dextrose, sucrose, dimethyl sulfoxide, or other suitable non-toxic carriers, at concentrations of from about 0.03% to about 25% by weight. These solids may then be conveniently added to the drinking water by the poultry grower.

A typical drinking water formulation contains sulfaguanidine, 0.3%; 1-(2-n-propyl-4-amino-5-pyrimidinylmethyl)-2-methyl pyridinium chloride hydrochloride, 9.6%; dextrose, 30%; propylene glycol, 20%; dimethylpolysiloxane, 0.002%; polyoxyethylene sorbitan monoleate, 0.2%; water, to 100%.

According to a further aspect of this invention, there are provided compositions comprising poultry feed supplements or additives containing the sulfaguanidine previously described as an effective Marek's disease agent. In such compositions the compound is mixed with or dispersed in an orally ingestible carrier vehicle that is non-toxic to the poultry and compatible with the finished feedstuff. These feed supplements contain a significantly higher percentage of sulfaguanidine than does the finished feed, and are mixed with or blended into the feedstuff before administration to the poultry. In order to assure uniform distribution of the compound in the finished feed, it is customary to employ an intermediate dilution step in which the supplement is blended with a portion of the final feed, and this "intermediate mix" is then added to the remainder of the feed with adequate mixing. The sulfaguanidine described hereinabove may be formulated into feed supplement compositions containing from about 0.05% to about 50% by weight of drug. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 1.0% to about 20% by weight of active ingredient are preferred.

Diluent or carrier vehicles that may be used in these poultry feed supplements are solid orally ingestible poultry feed additives such as corn meal, distillers' dried grains, ground oyster shell, citrus meal fermentation residues, wheat shorts, wheat middlings, molasses solubles, corn gluten feed, soybean meal, dehulled soya flour, crushed limestone, fermentation mycelia, edible vegetable substances and the like. Nutritive carriers are preferred since the finished feed is benefitted thereby.

Examples of typical feed supplements containing the compound of the present invention are:

(A)

| | Lbs. |
|---|---|
| Sulfaguanidine | 1.5 |
| Amprolium | 25.0 |
| Wheat middlings | 73.5 |

(B)

| | |
|---|---|
| Sulfaguanidine | 5.0 |
| Corn gluten feed | 95.0 |

(C)

| | |
|---|---|
| Sulfaguanidine | 2.0 |
| Corn germ meal | 40.0 |
| Corn distillers' grains | 58.0 |

(D)

| | |
|---|---|
| Sulfaguanidine | 1.0 |
| Corn distillers' dried grains | 99.0 |

(E)

| | |
|---|---|
| Sulfaguanidine | 2.0 |
| Distillers' dried grains | 97.5 |

This invention is described above with reference to the use of sulfaguanidine. We have also described derivatives of sulfaguanidine which can be substituted in the $N_2$- and/or $N_4$-positions. We have also found that the sulfaguanidine can be nuclear-substituted in the benzene-ring moiety of the sulfaguanidine. Nuclear substituents have been described in the literature, especially loweralkyl, hydroxyl, or halogen, or combinations of these.

This invention can also be practiced using certain sulfanilamides other than the disclosed sulfaguanidines. Typical of such sulfanilamides would be those wherein the $N_4$ nitrogen atom bears one or more substituents such as, for example, hydrogen, loweralkyl, loweralkanoyl, and carbamoyl and/or those wherein the $N_1$ nitrogen atom bears one or more substituents such as, for example, hydrogen, loweralkyl, loweralkanoyl, aroyl, such as benzoyl, heteroaroyl, carboxyalkanoyl, carboxyaroyl, haloalkanoyl, aryl such as benzyl and phenyl, carboxyalkyl, carboxyaryl, haloalkyl, and heteroaryl such as a 5- or 6-membered monocyclic heteroaromatic ring having from 1 to 3 hetero atoms selected from the group consisting of oxygen, nitrogen and sulfur and which, optionally, may be substituted with one or more groups such as, for example, loweralkyl, loweralkoxy, alkenyloxy, loweralkanoyl, halo, amino, loweralkylamino, loweralkanoylamino and loweralkylsulfonate. Specific heteroaryl-substituted sulfanilamides include sulfaquinoline, sulfaquinoxaline, sulfapyridine, sulfapyrimidine, and sulfathiadiazole.

What is claimed is:

1. The method for combatting Marek's disease in poultry which comprises administering to poultry susceptible to the disease a feedstuff containing 0.0002% to 0.2% by weight of sulfaguanidine or a salt thereof.

2. The method of claim 1 in which the weight percent of the sulfaguanidine in the feed is 0.01% to 0.1% by weight.

3. The method of claim 1 in which the weight percent of the sulfaguanidine in the feed is 0.002% to 0.1% by weight.

4. A composition which comprises a poultry feedstuff having admixed therein from about 0.0002% to 0.2% by weight of sulfaguanidine or a salt thereof.

5. A composition of claim 4 which contains 0.01% to 0.1% by weight of sulfaguanidine or a salt thereof.

6. A composition of claim 5 which contains 0.002% to 0.1% by weight of sulfaguanidine or a salt thereof.

References Cited

Tabenkin et al., Chem. Abst., vol. 47 (1953), p. 9445d.

SAM ROSEN, Primary Examiner